United States Patent
Kast

(10) Patent No.: US 10,639,832 B2
(45) Date of Patent: May 5, 2020

(54) METHOD FOR FORMING SEALS ON SEAL CARRIERS

(71) Applicant: CQLT SaarGummi Technologies S.à.r.l., Remich (LU)

(72) Inventor: Christian Kast, Merzig-Brotdorf (DE)

(73) Assignee: CQLT SaarGummi Technologies S.à.r.l., Remich (LU)

( * ) Notice: Subject to any disclaimer, the term of this patent is extended or adjusted under 35 U.S.C. 154(b) by 548 days.

(21) Appl. No.: 14/913,112

(22) PCT Filed: Aug. 23, 2014

(86) PCT No.: PCT/EP2014/002314
§ 371 (c)(1),
(2) Date: Feb. 19, 2016

(87) PCT Pub. No.: WO2015/039725
PCT Pub. Date: Mar. 26, 2015

(65) Prior Publication Data
US 2016/0176089 A1    Jun. 23, 2016

(30) Foreign Application Priority Data

Sep. 17, 2013 (DE) .......... 10 2013 110 232
Feb. 12, 2014 (DE) .......... 10 2014 101 752

(51) Int. Cl.
*B29C 45/14* (2006.01)
*B60J 10/248* (2016.01)
(Continued)

(52) U.S. Cl.
CPC ...... *B29C 45/14344* (2013.01); *B23P 19/047* (2013.01); *B29C 45/16* (2013.01);
(Continued)

(58) Field of Classification Search
None
See application file for complete search history.

(56) References Cited

U.S. PATENT DOCUMENTS 3,159,886 A * 12/1964 Lynch ................ B60J 10/21
                                              220/DIG. 3
4,911,878 A    3/1990 Hopperdietzel
(Continued)

FOREIGN PATENT DOCUMENTS

CA        2527187      * 12/2004
DE     37 30 488 A1      3/1989
(Continued)

OTHER PUBLICATIONS

English translation of EP 1452372.*
(Continued)

*Primary Examiner* — Xiao S Zhao
*Assistant Examiner* — Emmanuel S Luk
(74) *Attorney, Agent, or Firm* — Collard & Roe, P.C.

(57) ABSTRACT

A method for forming seals on seal carriers, in particular vehicle doors or vehicle door frames, extrudes a sealing material strand which is to be processed to form a multiplicity of seals and has a cavity, coils or folds up the sealing material strand, forming a transportable unit that is transported to a processing site and the sealing material strand is fed continuously to a processing device by being drawn out of the transportable unit. During the processing, a section of the sealing material strand that is to be applied to the relevant seal carrier and forms the seal is in each case severed from the sealing material strand. In each case during or after the processing of the sealing material strand to form a seal, that section of the sealing material strand which forms (Continued)

Figure 1:
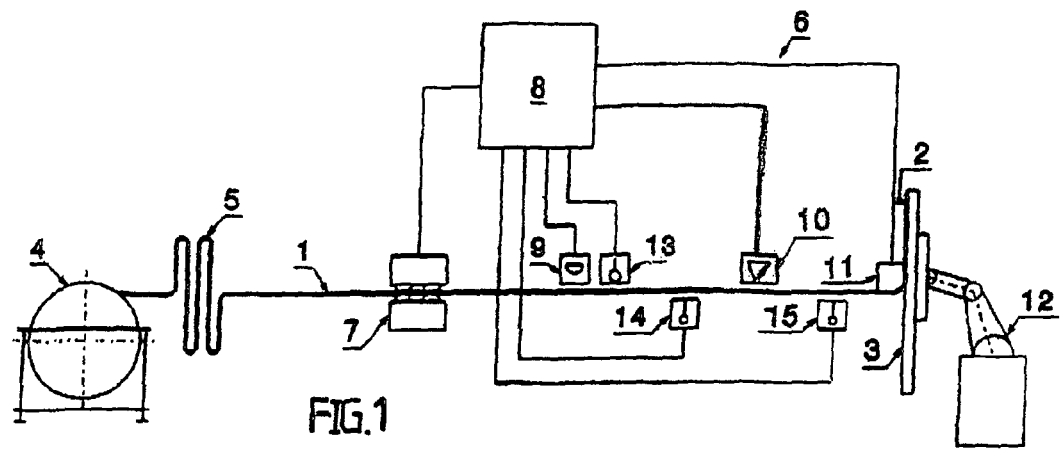

US 10,639,832 B2
Page 2 the seal is reinforced in places at least at one predetermined longitudinal position of the section by introducing material into the cavity.

15 Claims, 3 Drawing Sheets

(51) Int. Cl.
| | |
|---|---|
| *B60J 10/24* | (2016.01) |
| *B60J 10/80* | (2016.01) |
| *B60J 10/18* | (2016.01) |
| *B23P 19/04* | (2006.01) |
| *B29C 45/16* | (2006.01) |
| *B29K 67/00* | (2006.01) |
| *B29K 71/00* | (2006.01) |
| *B29L 31/26* | (2006.01) |

(52) U.S. Cl.
CPC ............ *B60J 10/18* (2016.02); *B60J 10/24* (2016.02); *B60J 10/248* (2016.02); *B60J 10/80* (2016.02); *B29C 2045/14459* (2013.01); *B29K 2067/00* (2013.01); *B29K 2071/00* (2013.01); *B29L 2031/26* (2013.01)

(56) References Cited

U.S. PATENT DOCUMENTS 5,256,361 A * 10/1993 Keys .................. B29C 65/70
 156/221
7,594,806 B2 * 9/2009 Santin ................ B29C 44/128
 264/46.6

FOREIGN PATENT DOCUMENTS

| | | |
|---|---|---|
| DE | 101 50 827 A1 | 5/2003 |
| DE | 10 2005 028 069 A1 | 5/2006 |
| DE | 10 2011 075 829 A1 | 11/2012 |
| EP | 1 452 372 A1 | 9/2004 |
| EP | 2 025 489 A2 | 2/2009 |
| JP | 01263008 * | 10/1989 |
| WO | 03/103921 A1 | 12/2003 |

OTHER PUBLICATIONS

International Search Report of PCT/EP2014/002314, dated Nov. 4, 2014.
German Office Action dated Feb. 24, 2015 in DE 10 2014 101 752.8, with English translation of relevant parts.

* cited by examiner

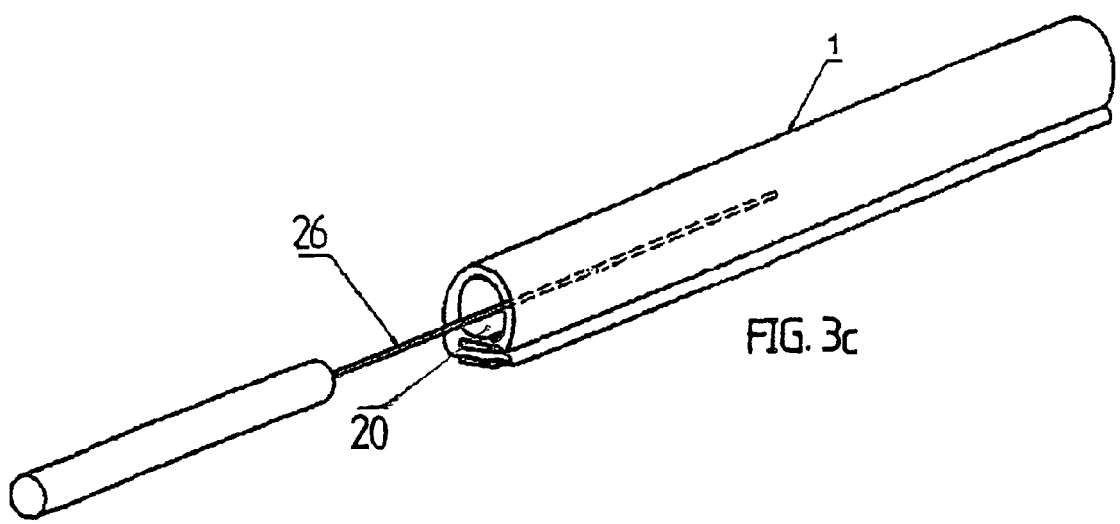
FIG. 3c
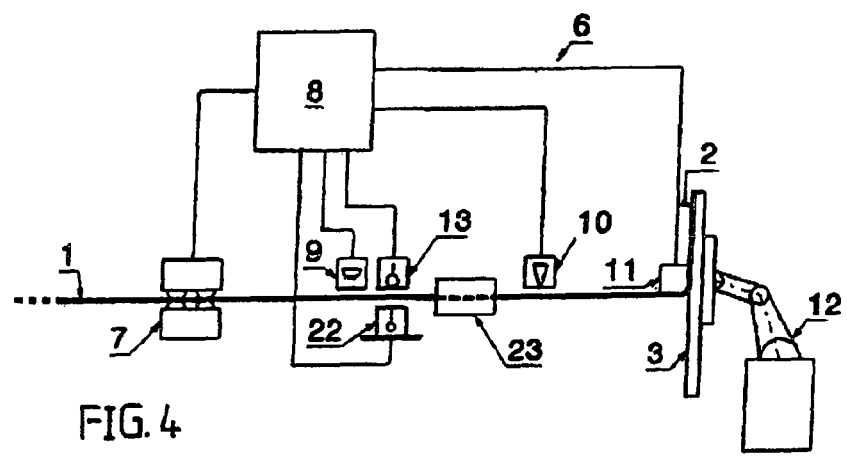
FIG. 4
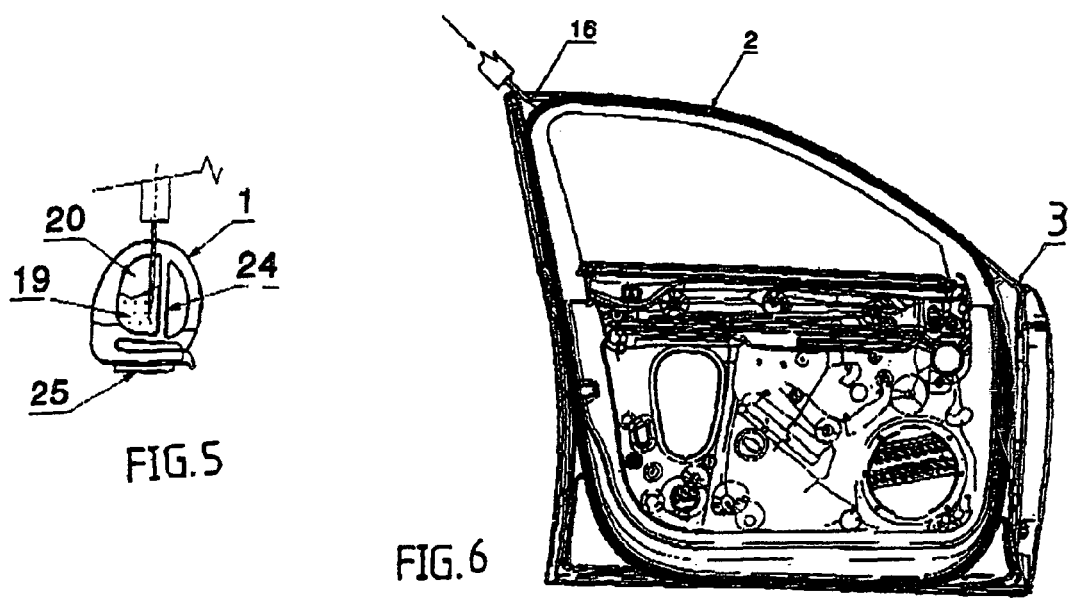
FIG. 5
FIG. 6

METHOD FOR FORMING SEALS ON SEAL CARRIERS

CROSS REFERENCE TO RELATED APPLICATIONS

This application is the National Stage. of PCT/EP2014/002314 filed on Aug. 23, 2014, which claims priority under 35 U.S.C. § 119 of German Application No. 10 2013 110 232.8 filed on Sep. 17, 2013 and German Application No. 10 2014 101 752.8 filed on Feb. 12, 2014, the disclosures of which are incorporated by reference. The international application under PCT article 21(2) was not published in English.

According to the preamble of claim 1, the invention relates to a method for the formation of seals on seal carriers, particularly vehicle doors or vehicle door frames, in which a sealing material strand having a cavity and to be processed to form a multiplicity of seals is extruded, the sealing material strand is coiled up or folded up, forming a transportable unit, and the sealing material strand is continuously passed to a processing device, being pulled out from the unit, wherein during the scope of processing, a section of the sealing material strand that forms the seal and is to be applied to the seal carrier in question is severed from the sealing material strand.

A method of such a type is known, for example, from DE 10 2005 028 069 A1. It is advantageous that this method allows the formation of vehicle door seals on site at the vehicle manufacturer, from endless extruded sealing material strands. Conventionally, such seals are produced on site from sealing strands prefinished at a certain length and possibly formed into a ring.

Furthermore, sealing strands prefinished at a specific length, extruded with a cavity, are known from use; these are reinforced, at certain locations, by insert pieces or elastomer material. The insert pieces are pushed into the cavity, for example using rods that are provided with a length scale or rods having a known length, and brought to the intended longitudinal position. This longitudinal position corresponds to a location that is under particular stress in the installed state of the sealing strand, for example at a bend, at which undesirable deformation is counteracted by the reinforcement, and the shape, above all, however, also in particular, the resulting sealing function, is maintained. Local reinforcements can also be necessary for other reasons.

A new method for the formation of seals from sealing material strands supplied in endless manner, of the type stated initially, is created by the present invention, which method is characterized in that during or after processing of the sealing material strand to form a seal, in each instance, the section of the sealing material strand that forms the seal is reinforced at certain locations, at least at one predetermined longitudinal position, by means of introduction of material into the cavity. Reinforcement at certain locations can be carried out not only during processing of the sealing material strand but also when the sealing material strand is already connected with the seal carrier.

Introduction of the material can take place from the open end of the sealing material strand section that is at the front in the advancement direction, in each instance, particularly during a break in advancement that is necessary when changing the seal carrier, during which break the sealing material strand section is at a stop.

The material can be introduced into the cavity from the open end as an elastic body, for example using advancement rods or compressed air, or as a material capable of flow, which solidifies to form an elastically deformable material.

Alternatively, introduction of the material takes place by means of injection of material capable of flow, which solidifies to form an elastically deformable material, through the cavity wall.

The material introduced at certain locations can be locked in place in the longitudinal strand direction, by means of adhesion to or/and shape fit with the cavity wall, so that the reinforcement maintains its longitudinal position and is not undesirably displaced.

Introduction of the material, particularly injection of the material capable of flow, during processing of the sealing material strand, can take place at the same time or one after the other, at multiple predetermined longitudinal positions of the section of the sealing material strand that forms the seal. In the latter case, a single locally fixed or restrictedly movable injection device can be used, past which the sealing material strand runs within the scope of its advancement movement.

Introduction of the material, particularly injection of the material capable of flow, during processing of the sealing material strand can be carried out during an advancement or during a stop of the sealing material strand. It is practical if the break in advancement of the sealing material strand is utilized for injection, which break necessarily occurs as the result of removal transport of a finished seal carrier fitted with reinforcements, and feed of the next seal carrier to be fitted with reinforcements.

In a further embodiment of the invention, injection of the material capable of flow takes place during advancement, with an injection device moving along with the advanced sealing material strand. During each injection process, the injection device moves a short distance along with the advanced material strand, parallel to it, and afterward returns to its starting position, preferably automatically.

It is practical if the introduction position on the sealing material strand is determined on the basis of an advancement length measurement during introduction of the material during advancement.

The formation of reinforcements at certain locations by means of introduction of material can be integrated into the method mentioned initially in particularly advantageous manner if material defects are detected during this method, and defective sections of the sealing material strand are severed and discarded, and, in this regard, in particular, simplified detection of defect markings on the sealing material strand takes place. If discarding of defective sections is required, the amount of scrap material that occurs is reduced by introducing reinforcements only in the final phase of the formation of seals.

It is practical if the material capable of flow is introduced using a cannula that penetrates the cavity wall or extends through the open end in the longitudinal strand direction. The cannula can penetrate the cavity wall perpendicularly or at a slant, wherein in the latter case, the cannula is preferably inclined in the advancement direction of the sealing material strand.

The material capable of flow can be, for example, a plastic, particularly polyether or polyester, modified with rubber. It is practical if the integrated material capable of flow solidifies to form a cellular material.

The method can be carried out in such a manner that the material does not fill the cavity completely, in terms of cross-section, but rather only partially, in such a manner that a desired reinforcement effect is achieved. In an embodiment of the method, the materials forms a tubular inner lining of the cavity, wherein such a lining can be formed in the shape of a tube or partial tube, by means of rotation of the sealing material strand about its longitudinal axis before completion of the solidification of the material capable of flow.

To delimit the design of the cavity, a partition wall that extends in the longitudinal strand direction can be introduced into the cavity.

In a further embodiment of the method, the material capable of flow is brought into a desired shape before completion of solidification, by means of squeezing the sealing material strand, in order to achieve a specific reinforcement effect.

Figure 2:
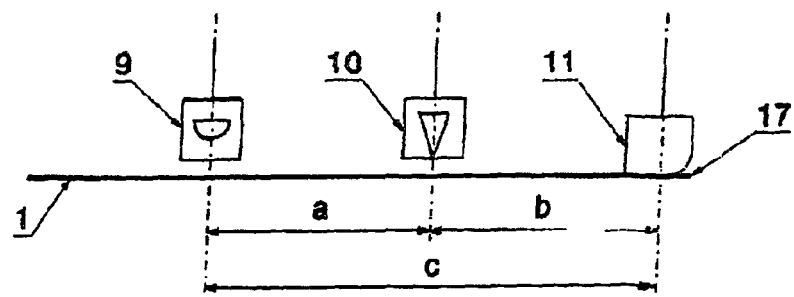
Figure 7:
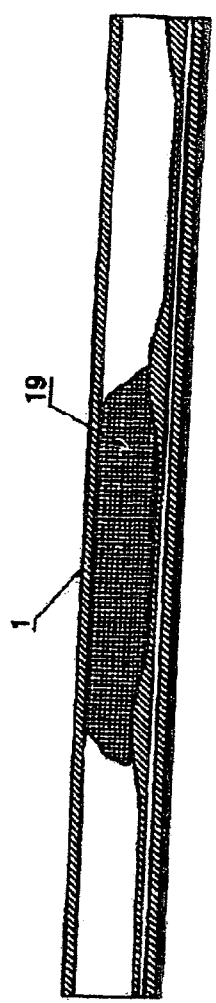
Figure 8:
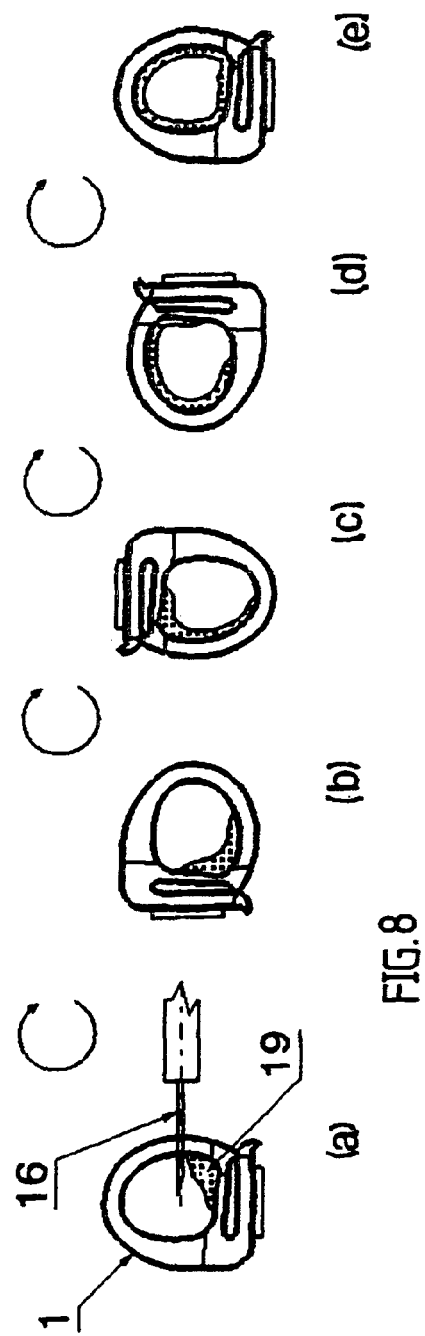

In the following, the invention will be explained in greater detail using exemplary embodiments and the attached drawings that relate to these exemplary embodiments. The drawings show:

FIG. 1 a system that works according to the method according to the invention, for the formation of seals on vehicle doors from a sealing material strand supplied in endless manner, FIG. 2 a representation that explains the functions of the system according to FIG. 1, FIG. 3 detailed representations that explain different possibilities for the production of reinforcements at certain locations, FIG. 4 a part of a system that works according to the method according to the invention, according to a further exemplary embodiment of the present invention, FIG. 5 a further representation that explains the injection of material, FIG. 6 a representation that explains the production of a reinforcement in an installed sealing strand, by means of injection, FIG. 7 a representation that explains how a reinforcement is locked in place within the strand cavity, and FIG. 8 a representation that explains the production of a hose-like reinforcement by means of injection.

A material strand 1 for the formation of seals 2 that run around vehicle doors 3 is unwound from a transport and supply roll 4 and passed, running over a buffer 5, to a processing device 6 that produces the door seals. The vehicle doors 3 are transported to the device and away in cycles.

The processing device 6 comprises a transport and guidance device 7. The transport and guidance device 7, which is shown in simplified form as a block in FIG. 1, has not only a drive caterpillar but also drive and guidance rollers distributed over the processing length of the material strand 1, which, like the drive caterpillar, are not shown in detail. The drive and guidance device 7 stands in connection with a device 8 that controls the processing device 6. The control device 8 can change the advancement speed of the material strand 1 and stop the advancement, if necessary.

In the example shown, the processing device 6 furthermore has a defect recognition device 9 that detects defects in the material strand 1. In the example described, the defect recognition device 9 optically detects markings applied to the material strand 1 by the strand manufacturer (not shown), which identify defective strand sections.

A further component of the processing device 6 is formed by a severing device 10 for cutting off a section of the material strand 1 that is required for the formation of a seal 2, in each instance. The severing device 10 receives control signals from the control device 8. The control device 8 furthermore controls an application device 11, which applies the section of the material strand 1 that forms a seal 2, in each instance, to the vehicle door 3 in question, and connects it with or glues it to the latter.

In the example described, a robot 12 holds and moves the vehicle door 3 relative to the application device 11, in such a manner that a seal that runs around the vehicle door 3 is formed, by means of the continuously applied material strand or material strand section, while the application device 11 remains in place.

The control device 8 furthermore stands in connection with an advancement measurement device 13 that detects the advancement length of the material strand 1. The advancement measurement device 13, shown separately here, can be integrated into the drive and guidance device 7 and have common functional parts with the latter.

As further components, the processing device 6 has injection devices 14 and 15, which, in the example described, introduce a material 19 capable of flow at two positions, in each instance, into the section of the material strand 1 that forms the seal, into the cavity 20 of the material strand 1, which material solidifies and forms a reinforcement. At the locations in question, the seal formed from the section is under particular stress, for example due to bent placement.

The injection devices 14, 15 controlled by the control device 8 have an injection cannula 16 that penetrates the cavity wall of the material strand 1. The injection devices 14, 15 can be carried along with the material strand 1 during the injection period, so that an injection can still be carried out during application of the material strand section that forms the seal 2 to the vehicle door 3. Measurement values of the advancement measurement device 13 are integrated and stored by the control device 8, in each instance.

At every starting point of an application process, during which the advancement of the material strand 1 is restarted and a material strand section having the length c is processed, forming a seal 2, the control device 8 sets the advancement length value to the value b, which, according to FIG. 2, corresponds to the distance of the severing device 10 from the free end 17 of the material strand 1. If the measured advancement length, added to b, reaches the value c during processing of the material strand 1 by the application device 11, which value is equal to the length of the section of the material strand 1 that forms the seal 2, then the control device 8 transmits a signal for severing of the material strand 1 to the severing device 10. The material strand 1 and the severed section are conveyed further, until the newly formed free end of the material strand 1 has reached its starting value for the next application process. If necessary, a signal of a contact switch (not shown) indicating this end position is output to the control device 8.

Before every new start of an application process or during it, the control device 8 furthermore generates a signal for injection of material by the injection devices 14, 15. If the injection extends, in terms of time, to the application process, then the injection devices 14, 15 are temporarily made to follow the strand, and then return to their starting position.

A strand section can also be stopped for the purpose of injection, by means of supplying the strand by way of buffers.

In the event that the defect recognition device 9 determines a defective strand section, the control device 8 pursues the advancement length value for the back end of the defective strand section from the defect recognition device 9, and transmits a signal for severing of the strand end having the defective strand section to the severing device 10 when the advancement length for the back end is equal to the distance a between the defect recognition device 9 and the severing device 10. A discarding device (not shown) conducts the defective strand end away, to be discarded.

As is evident from FIG. 3, the injection devices 14, 15 have not only the injection cannula 16 already mentioned, but also devices 18 that can be controlled by the control device 8, for extending the injection cannula 18. When it is extended, it penetrates into the cavity 20 of the material strand 1, wherein its slanted end leaves a hardly recognizable slit in the cavity wall. The slit could furthermore be formed in a non-visible region of the strand.

Material 19 capable of flow that is introduced into the cavity 20 of the material strand 1 by way of the injection cannula 16 consists, in the example described, of single-component polyester or polyether that has been modified with rubber, and hardens to form a cellular, flexible material in the cavity 20, if applicable with adhesion to the cavity wall. It is advantageous if the reinforcement is fixed in place in the longitudinal strand direction by means of adhesion of the material to the cavity wall. Such locking in place can also be achieved by means of shape fit, according to FIG. 7, in that the cavity wall is provided with projections and/or depressions that recur in the longitudinal strand direction.

The extension device 18 can be displaced, in carriage-like manner, on a guide 21 that runs parallel to the sealing material strand, if injection takes place during advancement of the material strand 1. Alternatively, the extension device 18 can also be affixed to a drum, in the case of injection during advancement, and can be rotated with this drum, wherein the transported sealing material strand is wound around the drum.

As is shown using FIG. 4, material injection can also already take place during advancement of the material strand 1, before the free end of the material strand, in each instance, has reached the starting point for the next application process, wherein a single injection device 22, as shown in FIG. 4, introduces material 19 to be solidified into the cavity 20 during advancement, at different locations, one after the other. During the injection phase, the injection device 22 is moved along with the material strand 1, along the guide 21.

A control device 8 determines the respective time points at which the injection device 22 becomes active, using an advancement measurement device 13. A rotational guide device 23 that follows the injection device 22 rotates the material strand 1 about its longitudinal axis. As the result of this rotation, the material 19 lies against the inner wall of the cavity 20 all around, and forms a hose-like reinforcement when rotated by 360°, as shown in FIG. 8, by which the cavity cross-section is only partially filled in the reinforcement region.

A further possibility for limited filling of injected material 19 into a cavity 20 is shown in FIG. 5. The material 19 fills the cavity only partially, in terms of cross-section, because the cavity 20 is divided by a partition wall 24.

The reference symbol 25 in FIG. 5 refers to a double-sided adhesive tape for attaching the material strand 1 to the vehicle door 3.

As an alternative to the material injection through the cavity wall as described, introduction of the material could take place through the open end of the section, which end is at the front in the advancing direction, particularly during a conveying break of the sealing strand material section having the length c that is required when changing doors.

In this regard, pushing plug-like material pieces into the cavity, using rods and measuring the push-in length of the rods, would be possible. As an alternative, a stop for the material piece could be introduced into the cavity from the outside, through the cavity wall, or formed by means of constriction of the cavity, at the respective longitudinal positions of the section having the length c. Such stops could be used to particular advantage when introducing plug-like material pieces by means of compressed air.

Finally, according to FIG. 3c, a conducting lance 26 that extends in the longitudinal strand direction can be pushed into the cavity, also with measurement of the push-in length, in order to introduce material capable of flow, which solidifies in place to form an elastically deformable material.

Figures 3A, 3B:
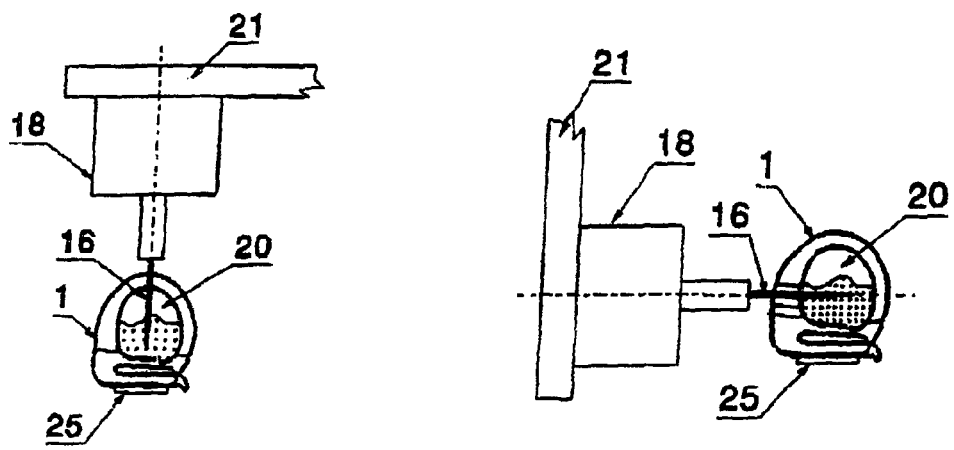

FIG. 3b shows the production of a reinforcement by means of the introduction of material capable of flow through an already existing opening in the wall of the cavity.

Subsequent production of a reinforcement on the finished, installed seal strand by means of injection is evident from FIG. 6.

The invention claimed is:

1. A method for forming seals on seal carriers, the method comprising the steps of:
   extruding a sealing material strand having a cavity and to be processed to form a multiplicity of seals;
   coiling up or folding up the sealing material strand to form a transportable unit;
   transporting the transportable unit to a processing location;
   pulling the sealing material strand out from the transportable unit and continuously passing the sealing material strand to a processing device; processing the sealing material strand at the processing location by severing a section of the sealing material strand that forms the seal from the sealing material strand and applying the seal to the seal carrier; and
   at the processing location during the processing of the sealing material strand to form a seal, in each instance, reinforcing the section of the sealing material strand that forms the seal at certain locations, at least at one predetermined longitudinal position of the section, by introducing material into the cavity, wherein the material is introduced into the cavity while applying the seal to the seal carrier.

2. Method according to claim 1, wherein the introduction of the material (19) takes place by means of introduction or insertion into the cavity (20) from the open end of the section that is at the front in the advancement direction, or the material is injected into the cavity through the cavity wall, as a material capable of flow, which solidifies to form an elastically deformable material.

3. Method according to claim 2, wherein the material is introduced into the cavity (20) from the open end, as a solid body or as a material capable of flow, which solidifies to form an elastically deformable material.

4. Method according to claim 2, wherein the material (19) capable of flow is injected into the cavity (20) using a cannula (16) that penetrates the cavity wall or is introduced into the cavity (20) using a conducting lance (26) that extends through the open end in the longitudinal strand direction.

5. Method according to claim 2, wherein the injected or introduced material (19) capable of flow is brought into a desired shape before completion of solidification, by means of deformation of the sealing material strand (1), if applicable with containment of the material capable of flow, by means of squeezing of the sealing material strand.

6. Method according to claim 1, wherein introduction of the material during processing of the sealing material strand (1) is via injection and takes place at the same time or one after the other, at multiple predetermined longitudinal positions of the section of the sealing material strand (1) that forms the seal (2).

7. The method according to claim 1, wherein introduction of the material during processing of the sealing material strand, takes place during continuous advancement of the sealing material strand or when it is stopped.

8. The method according to claim 7, wherein injection of the material capable of flow takes place during continuous advancement, with an injection device moving along with the advanced sealing material strand, or when the sealing material strand is stopped.

9. The method according to claim 7, wherein during introduction of the material during continuous advancement of the sealing material strand, the longitudinal position for introduction is determined using an advancement length measurement.

10. The method according to claim 1, wherein a polyester or polyether modified with rubber is injected or introduced as the material.

11. The method according to claim 1, wherein the material fills the cavity only partially, in terms of cross-section.

12. The method according to claim 11, wherein the material forms a tubular inner lining of the cavity as a reinforcement.

13. The method according to claim 12, wherein the tubular inner lining is formed by means of rotation of the sealing material strand about its longitudinal axis before completion of the solidification of the material.

14. The method according to claim 1, wherein an inner wall that delimits the spread of the material is introduced into the cavity.

15. The method according to claim 1, wherein the material is locked in place in the longitudinal strand direction, by means of adhesion to or shape fit with the wall of the cavity.

* * * * *